(12) United States Patent
Haldeman et al.

(10) Patent No.: US 11,401,040 B2
(45) Date of Patent: Aug. 2, 2022

(54) ROTOR HUB FAIRING WITH INTEGRAL COOLING CAPABILITIES

(71) Applicant: Bell Textron Inc., Fort Worth, TX (US)

(72) Inventors: Andrew Paul Haldeman, Fort Worth, TX (US); Amarjit Olenchery Kizhakkepat, Fort Worth, TX (US); Gary Miller, North Richland Hills, TX (US); Diana Tinlin, Fort Worth, TX (US); Glenn Shimek, Kennedale, TX (US)

(73) Assignee: Textron Innovations Inc., Fort Worth, TX (US)

( * ) Notice: Subject to any disclaimer, the term of this patent is extended or adjusted under 35 U.S.C. 154(b) by 217 days.

(21) Appl. No.: 16/824,488

(22) Filed: Mar. 19, 2020

(65) Prior Publication Data
US 2021/0291989 A1    Sep. 23, 2021

(51) Int. Cl.
*B64D 13/00*   (2006.01)
*F01D 25/12*   (2006.01)
(Continued)

(52) U.S. Cl.
CPC .............. *B64D 13/006* (2013.01); *B64C 7/00* (2013.01); *B64C 27/001* (2013.01); *B64C 27/06* (2013.01);
(Continued)

(58) Field of Classification Search
CPC ......... B64D 13/006; B64C 7/00; B64C 27/04; B64C 27/06; B64C 27/08; B64C 27/001; B64C 2027/003; F01D 5/10; F01D 5/046; F01D 5/08; F01D 5/081; F01D 5/085; F01D 25/12
See application file for complete search history.

(56) References Cited

U.S. PATENT DOCUMENTS 5,110,260 A  *  5/1992  Byrnes .................... B64C 27/35
                                                 416/134 A
7,229,251 B2 *  6/2007  Bertolotti ................ B64C 27/12
                                                 416/33
(Continued)

FOREIGN PATENT DOCUMENTS

FR           3081953 A1 * 12/2019  ........... B64C 27/001

OTHER PUBLICATIONS

Martin, D. M., "Experimental Investigation of Advanced Hub and Pylon Fairing Configurations to Reduce Helicopter Drag," vol. 4540, National Aeronautics and Space Administration, Ames Research Center, 1993; 96 pages.
(Continued)

*Primary Examiner* — Joshua J Michener
*Assistant Examiner* — Cindi M Curry
(74) *Attorney, Agent, or Firm* — Patent Capital Group

(57) ABSTRACT

One embodiment is a rotor system including a rotor hub comprising a plurality of extension arms for connecting rotor blades to the rotor hub; a plurality of dampers connected between a respective one of the extension arms and the rotor hub; and a fairing disposed over the rotor hub, the fairing including an inlet plenum through which air is drawn from outside the fairing into the fairing; and at least one duct for conducting the air toward the at least one of the dampers.

18 Claims, 4 Drawing Sheets

(51) Int. Cl.
    *B64C 27/00*     (2006.01)
    *B64C 27/06*     (2006.01)
    *B64C 27/473*     (2006.01)
    *B64C 7/00*     (2006.01)
    *F01D 5/10*     (2006.01)

(52) U.S. Cl.
    CPC .............. *B64C 27/473* (2013.01); *F01D 5/10* (2013.01); *F01D 25/12* (2013.01); *B64C 2027/003* (2013.01); *F05D 2240/20* (2013.01); *F05D 2260/221* (2013.01)

(56) References Cited

U.S. PATENT DOCUMENTS

| | | | |
|---|---|---|---|
| 2012/0175461 A1* | 7/2012 | van der Westhuizen | B64C 27/025 244/17.25 |
| 2014/0017085 A1* | 1/2014 | Amari | B64C 27/35 416/106 |
| 2014/0090937 A1* | 4/2014 | Wereley | B64C 27/51 188/267.2 |
| 2018/0327089 A1* | 11/2018 | Shimek | B32B 5/26 |
| 2020/0055586 A1* | 2/2020 | Foskey | B64C 11/14 |

OTHER PUBLICATIONS

Montana, Peter S., "Experimental Investigation of Three Rotor Hub Fairing Shapes," Naval Ship Research and Development Center, Bethesda, MD, May 1975, AD-A012537, 90 pages; https://apps.dtic.mil/dtic/tr/fulltext/u2/a012537.pdf.

* cited by examiner

ROTOR HUB FAIRING WITH INTEGRAL COOLING CAPABILITIES

GOVERNMENT RIGHTS

This invention was made with United States Government support under Agreement No. W911W6-19-9-0002, awarded by the Army Contracting Command-Redstone Arsenal. The United States Government has certain rights in the invention.

TECHNICAL FIELD

This disclosure relates generally to aircraft and, more particularly, to a rotor hub fairing for such aircraft having integral lead/lag damper cooling capabilities.

BACKGROUND

Fluid motion within a fluid-elastic or hydraulic damper for implementing a lead/lag damper in a rotorcraft rotor hub, generates a significant amount of heat that must be dissipated quickly so as to not adversely affect damper performance. In a rotor hub that is not completely covered by a rotor hub fairing, airflow over the dampers will keep them sufficiently cool. Conversely, in a rotor hub that is completely covered by a rotor hub fairing, there is insufficient airflow to adequately cool the dampers, which will impede the performance of the dampers and potentially create an unstable rotor system.

SUMMARY

One embodiment is a rotor system including a rotor hub comprising a plurality of extension arms for connecting rotor blades to the rotor hub; a plurality of dampers connected between a respective one of the extension arms and the rotor hub; and a fairing disposed over the rotor hub, the fairing including an inlet plenum through which air is drawn from outside the fairing into the fairing; and at least one duct for conducting the air toward the at least one of the dampers.

Another embodiment is a rotorcraft including a fuselage and a rotor system associated with the fuselage. The rotor system includes a rotor hub comprising a plurality of extension arms for connecting rotor blades to the rotor hub; a plurality of dampers connected between a respective one of the extension arms and the rotor hub; and a fairing disposed over the rotor hub. The fairing includes an inlet plenum through which air is drawn from outside the fairing into the fairing and at least one duct for conducting the air toward the at least one of the dampers.

A method comprising drawing air into a dome shaped fairing disposed over a rotor hub through an inlet plenum using centrifugal force; directing the air toward at least one damper associated with the rotor hub via at least one duct; and expelling the air from the fairing via a clearance window proximate the at least one damper.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
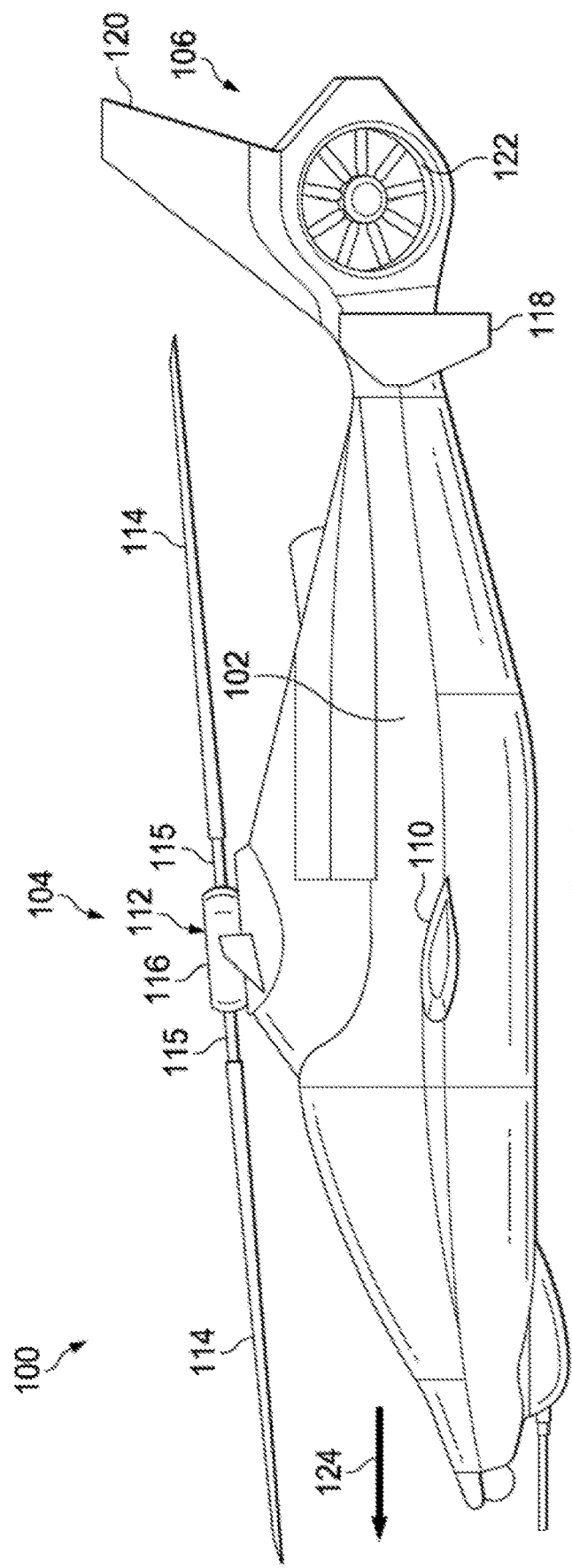
FIG. 1 illustrates a side view of an example aircraft having a rotor hub fairing with integral damper cooling capabilities in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of-an aircraft relative to another component or component aspect(s). The term "inboard" may refer to a location of a component that is within the fuselage of an aircraft and/or a spatial direction that is closer to a center of rotation or along a centerline of the aircraft relative to another component or component aspect(s), wherein the centerline runs in a between the front and the rear of the aircraft. The term "outboard" may refer to a location of a component that is outside the fuselage-of an aircraft and/or a spatial direction that farther from the center of rotation or centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
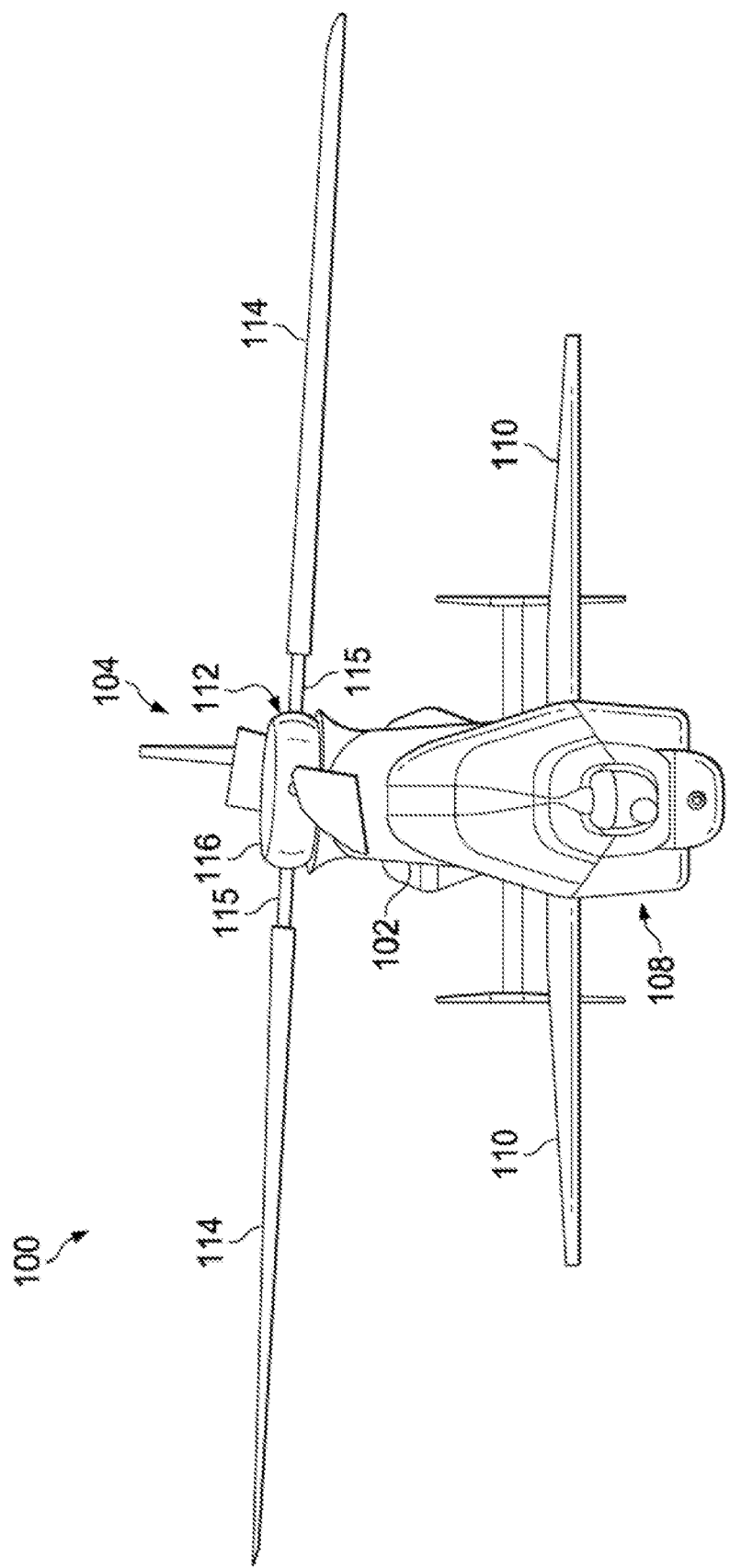
FIG. 2 illustrates a front plan view of the aircraft of FIG. 1.

Referring to FIGS. 1 and 2, illustrated therein are different views (i.e., a side view and a front view, respectively) of an example embodiment of an aircraft, which in the illustrated example is a rotorcraft 100. As shown in FIGS. 1 and 2, rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.).

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades") via blade extensions 115. Torque generated by the engine(s) of the rotorcraft causes the rotor blades 114 to rotate, which generates lift. In accordance with features of embodiments disclosed herein, and as described in greater detail below, the rotor hub 112 is completely shrouded by a rotor hub fairing 116 connected thereto and/or integrated therewith.

The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all of the rotor blades 114 are collectively pitched together (e.g., the pitch angle is the same for all blades), which affects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the rotor blades flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Lead-lag, or leading and lagging, refers to the movement of rotor blades (such as rotor blades 114) forward and backward along a vertical hinge. Lead-lag is a capability designed into a fully articulate rotor system, such as rotor system 104, to reduce stress on the system caused by blade flapping. The need for lead-lag capability is a result of the Coriolis effect, or the law of conservation of angular momentum. In particular, as a blade flaps up, the speed of the blade increases due to the movement of the center of mass of the blade toward the axis of rotation. In contrast, as the blade flaps down, the speed of the blade decreases due to the movement of the center of mass of the blade away from the axis of rotation. Fluid-elastic or hydraulic lead-lag dampers allow the forces to equalize, thereby removing undue stress on the system.

As previously noted, fluid-elastic or hydraulic lead-lag dampers used on fully articulated rotor hubs require cooling. This is typically accomplished via convection with the free stream air flow; however, such convective cooling is not possible when the dampers are contained within the hub fairing, as in the aircraft illustrated in FIGS. 1 and 2. In accordance with features of embodiments described herein, the damper cooling issue may be addressed by utilizing the hub fairing 116 as a centrifugal blower to move cool air from the free stream above the hub fairing through channels that exhaust onto the dampers, thereby providing the necessary airflow for convective cooling of the dampers that would otherwise be accomplished were the fairing 116 not installed. Once the cooling air has passed over the dampers, the resultant heated air will exhaust out of the hub fairing 116 thru the blade extension clearance windows. Because the hub fairing is attached directly to the main rotor hub, the additional power to pump the air is derived from the main rotor mast and will manifest as a small increase in main rotor torque.

Figure 3:
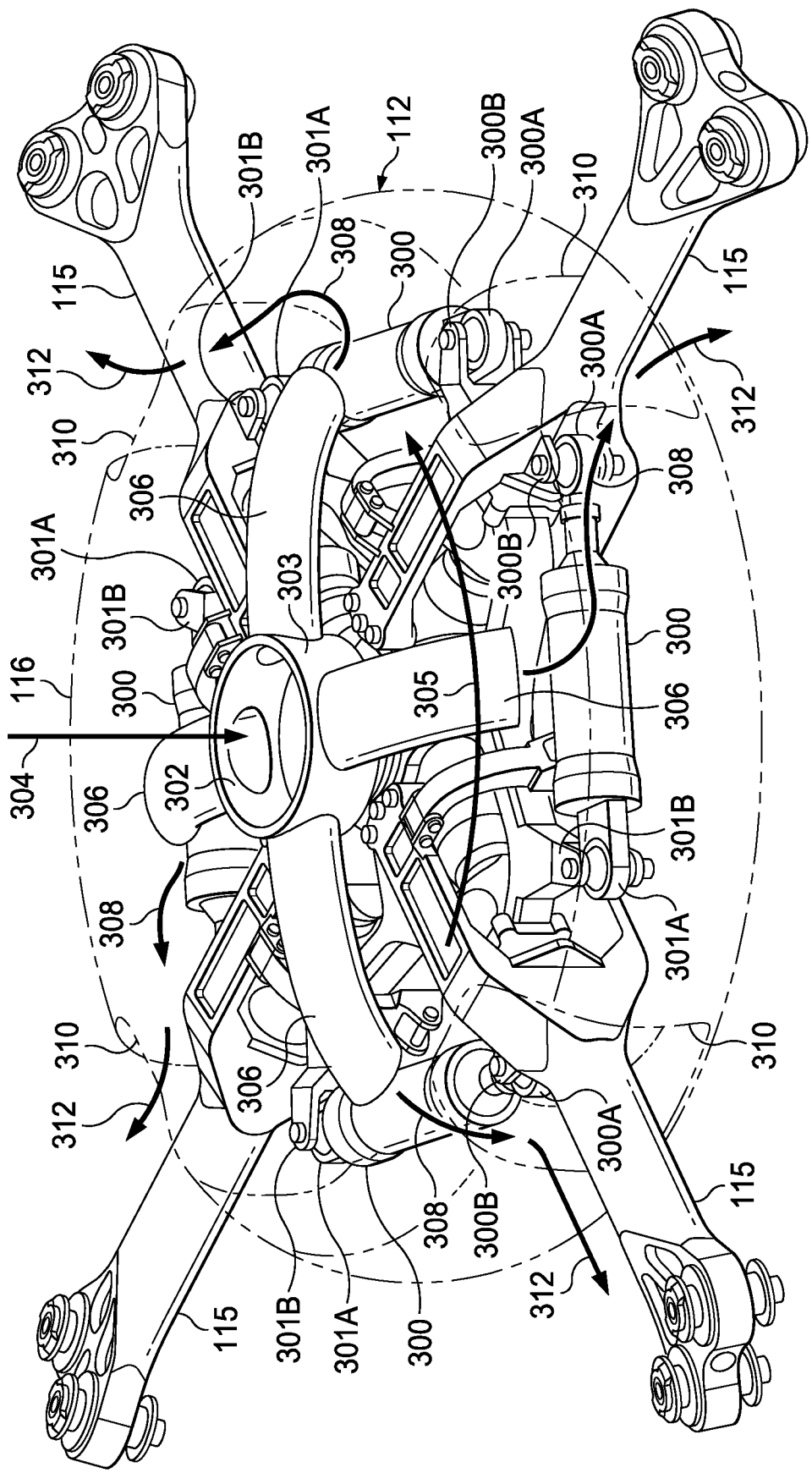
FIG. 3 illustrates the rotor hub of the aircraft of FIG. 1 showing a details of rotor hub fairing with integral damper cooling capabilities in accordance with certain embodiments of the present disclosure.

Referring now to FIG. 3, illustrated therein is a more detailed view of the rotor hub 112 shrouded by hub fairing 116. As shown in FIG. 3, lead-lag dampers 300 are associated with each of the rotor blade extension arms 115. In particular, each of the dampers 300 has a first end 300A connected to one of the rotor blade extension arms 115 at an attachment point 300B and a second end 301A connected to the rotor hub 112 at an attachment point 301B. In the illustrated embodiment, each damper 300 is attached on the trailing edge side of the rotor blade extension arm 115 to which it is connected. In accordance with features of embodiments described herein, an inlet 302 and associated inlet plenum 303 are provided through a top surface of the fairing 116. As represented in FIG. 3 by an air path 304, cool air is drawn into the fairing 116 through the inlet 302/inlet plenum 303 by the rotation of the fairing with the hub, which causes air in the ducts to move outwards, creating suction at the inlet such that air is drawn in therethrough. The air drawn in through the inlet 302 is directed by rotation of the rotor hub 112 in a direction indicated by an arrow 305 through ducts 306 and toward the outer edge of the fairing 116, where it is expelled onto a respective one of the dampers 300, as represented in FIG. 3 by air paths 308. After the air is used to cool the dampers 300, it is expelled through a respective one of blade extension clearance windows 310, as represented in FIG. 3 by air paths 312.

Figure 4:
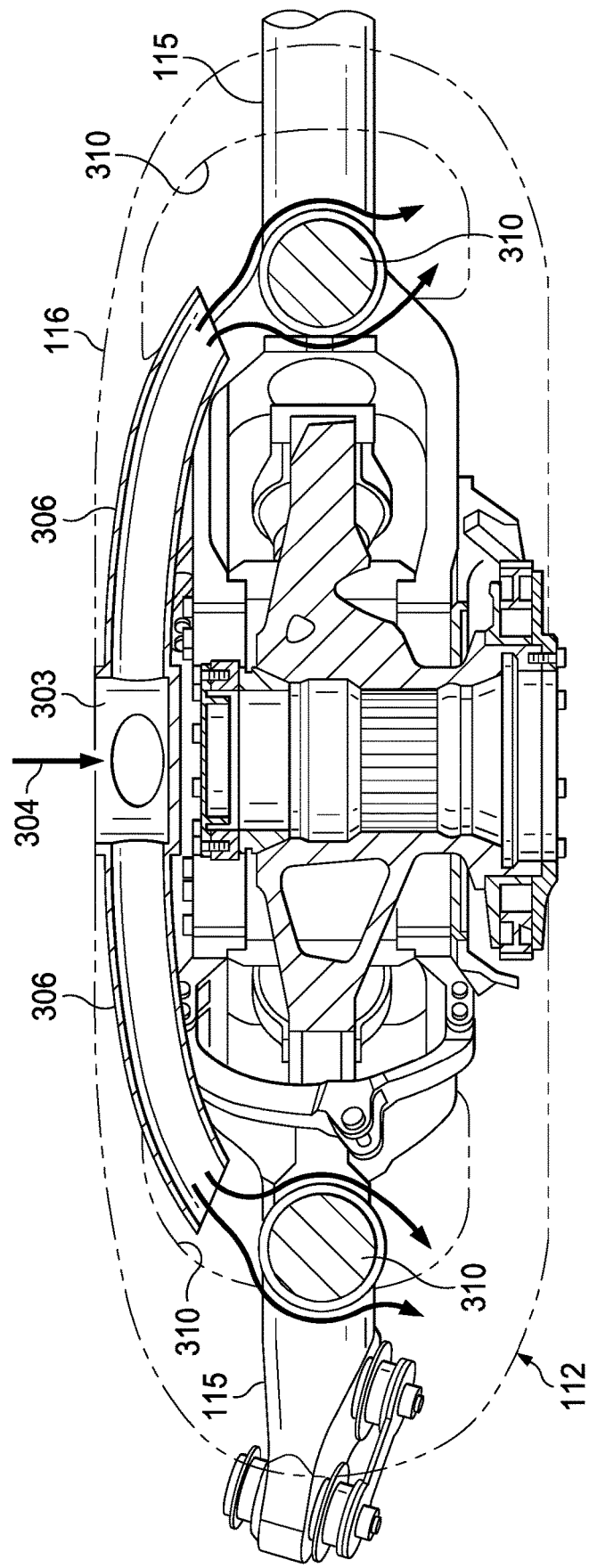
FIG. 4 illustrates a cross-sectional view of the rotor hub of FIG. 3 showing a details of rotor hub fairing with integral damper cooling capabilities in accordance with certain embodiments of the present disclosure.

FIG. 4 is a cross-sectional view of the rotor hub 112 as shown in FIG. 3, showing additional details with regard to placement of the ducts 306 and other elements, for example.

Figure 5:
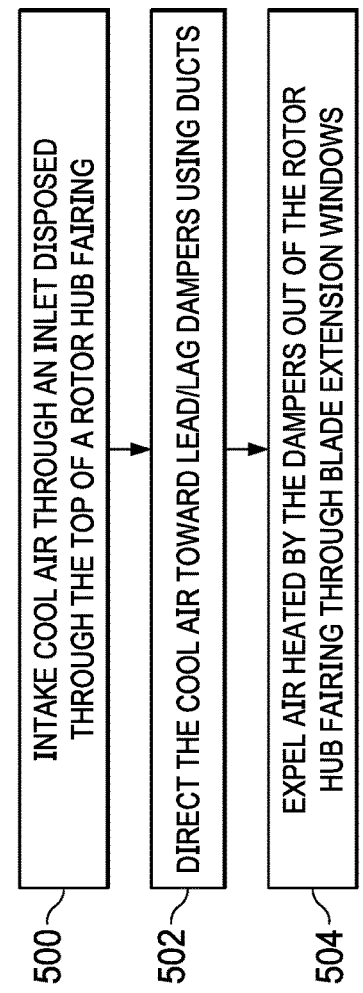
FIG. 5 is a flowchart illustrating an example method of implementing rotor hub fairing with integral damper cooling capabilities in accordance with certain embodiments of the present disclosure.

It should be noted that, although as shown in FIGS. 3 and 4, the inlet 302 is shown as being disposed on a top surface of the rotor hub fairing 116, it would also be possible to draw air into the fairing through an opening in the bottom surface of the fairing, in which case ducts would be provided for directing air upwards from the air inlet toward the dampers and expelled through the blade extension clearance windows in the same fashion as shown above with reference to FIGS. 3 and 4 and as will be described below with reference to FIG. 5.

FIG. 5 is a flowchart illustrating an example method of implementing a rotor hub fairing with integral damper cooling capabilities in accordance with certain embodiments of the present disclosure. Referring to FIG. 5, in step 500, cool air is drawn in through an inlet (e.g., inlet 302) disposed through the top of a rotor hub fairing (e.g., rotor hub fairing 116). In step 502, the cool air is directed toward lead/lag dampers (e.g., dampers 300) through respective ones of ducts (e.g. ducts 306) provided for that purpose. In step 504, after the cool air is used to cool the dampers, it is expelled from the rotor hub fairing through a respective one of the blade extension clearance windows (e.g., blade extension clearance windows 310).

Example 1 is a rotor system comprising a rotor hub comprising a plurality of extension arms for connecting rotor blades to the rotor hub; a plurality of dampers connected between a respective one of the extension arms and the rotor hub; and a fairing disposed over the rotor hub. The fairing includes an inlet plenum through which air is drawn from outside the fairing into the fairing and at least one duct for conducting the air toward the at least one of the dampers.

In Example 2, the rotor system of Example 1 may further include the at least one duct comprising a plurality of ducts and each one of the plurality of ducts corresponding to and directing a portion of the air toward a respective one of the plurality of dampers.

In Example 3, the rotor system of any of Examples 1 and 2 may further include the fairing further comprising a plurality of blade extension clearance windows, wherein each one of the extension arms extends through a respective one of the blade extension clearance windows.

In Example 4, the rotor system of any of Examples 1-3 may further include each one of the blade extension clearance windows corresponding to one of the plurality of dampers and the portion of the air directed toward each one of the dampers being expelled through the corresponding one of the blade clearance windows.

In Example 5, the rotor system of any of Examples 1-4 may further include each of the dampers comprising a lead-lag damper.

In Example 6, the rotor system of any of Examples 1-5 may further include each of the dampers comprising a fluid-elastic damper.

In Example 7, the rotor system of any of Examples 1-6 may further include the fairing being dome shaped.

In Example 8, the rotor system of any of Examples 1-7 may further include the inlet plenum being connected to an inlet disposed through a top surface of the fairing.

In Example 9, the rotor system of any of Examples 1-8 may further include, for each of the dampers, a first end of the damper being connected to a trailing edge side of a respective one of the blade extension arms and a second end of the damper being connected to an attachment point of the rotor hub.

Example 10 is a rotorcraft including a fuselage and a rotor system associated with the fuselage. The rotor system includes a rotor hub comprising a plurality of extension arms for connecting rotor blades to the rotor hub; a plurality of dampers connected between a respective one of the extension arms and the rotor hub; and a fairing disposed over the rotor hub. The fairing includes an inlet plenum through which air is drawn from outside the fairing into the fairing and at least one duct for conducting the air toward the at least one of the dampers.

In Example 11, the rotorcraft of Example 10 may further include the at least one duct comprising a plurality of ducts and each one of the plurality of ducts corresponding to and directing a portion of the air toward a respective one of the plurality of dampers.

In Example 12, the rotorcraft of any of Examples 10 and 11 may further include the fairing further comprising a plurality of blade extension clearance windows, wherein each one of the extension arms extends through a respective one of the blade extension clearance windows.

In Example 13, the rotorcraft of any of Examples 10-12 may further include each one of the blade extension clearance windows corresponding to one of the plurality of dampers and the portion of the air directed toward each one of the dampers being expelled through the corresponding one of the blade clearance windows.

In Example 14, the rotorcraft of any of Examples 10-13 may further include each of the dampers comprising a lead-lag damper.

In Example 15, the rotorcraft of any of Examples 10-14 may further include each of the dampers comprising a fluid-elastic damper.

In Example 16, the rotorcraft of any of Examples 10-15 may further include the fairing being dome shaped.

In Example 17, the rotorcraft of any of Examples 10-16 may further include the inlet plenum being connected to an inlet disposed through a top surface of the fairing.

In Example 18, the rotorcraft of any of Examples 10-17 may further include, for each of the dampers, a first end of the damper being connected to a trailing edge side of a respective one of the blade extension arms and a second end of the damper being connected to an attachment point of the rotor hub.

Example 19 is a method comprising drawing air into a dome shaped fairing disposed over a rotor hub through an inlet plenum using centrifugal force; directing the air toward at least one damper associated with the rotor hub via at least one duct; and expelling the air from the fairing via a clearance window proximate the at least one damper.

In Example 20, the method of Example 19 may further include the directing the air toward at least one damper comprising directing a portion of the air to each of a plurality of lead lag dampers using a plurality of ducts, wherein each one of the plurality of ducts is associated with a respective one of the plurality of lead-lag dampers.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotor system comprising:
   a rotor hub comprising a plurality of extension arms for connecting rotor blades to the rotor hub;
   a plurality of dampers connected between a respective one of the extension arms and the rotor hub; and
   a fairing disposed over the rotor hub, the fairing including:
      an inlet plenum through which air is drawn from outside the fairing into the fairing;
      a plurality of ducts corresponding to and directing a portion of the air toward a respective one of the plurality of dampers; and
      a plurality of blade extension clearance windows;
   wherein each one of the extension arms extends through a respective one of the blade extension clearance windows corresponding to one of the plurality of dampers; and
   wherein the portion of the air directed toward each one of the dampers is expelled through the corresponding one of the blade clearance windows.

2. The rotor system of claim 1, wherein each of the dampers comprises a lead-lag damper.

3. The rotor system of claim 1, wherein each of the dampers comprises a fluid-elastic damper.

4. The rotor system of claim 1, wherein the fairing is dome shaped.

5. The rotor system of claim 1, wherein the inlet plenum is connected to an inlet disposed through a top surface of the fairing.

6. The rotor system of claim 1, wherein for each of the dampers, a first end of the damper is connected to a trailing edge side of a respective one of the blade extension arms and a second end of the damper is connected to an attachment point of the rotor hub.

7. A rotorcraft comprising:
a fuselage; and
a rotor system associated with the fuselage, the rotor system comprising:
a rotor hub comprising a plurality of extension arms for connecting rotor blades to the rotor hub;
a plurality of dampers connected between a respective one of the extension arms and the rotor hub; and
a fairing disposed over the rotor hub, the fairing including:
an inlet plenum through which air is drawn from outside the fairing into the fairing;
a plurality of ducts corresponding to and directing a portion of the air toward a respective one of the plurality of dampers; and
a plurality of blade extension clearance windows;
wherein each one of the extension arms extends through a respective one of the blade extension clearance windows corresponding to one of the plurality of dampers; and
wherein the portion of the air directed toward each one of the dampers is expelled through the corresponding one of the blade clearance windows.

8. The rotorcraft of claim 7, wherein each of the dampers comprises a lead-lag damper.

9. The rotorcraft of claim 7, wherein each of the dampers comprises a fluid-elastic damper.

10. The rotorcraft of claim 7, wherein the fairing is dome shaped.

11. The rotorcraft of claim 7, wherein the inlet plenum is connected to an inlet disposed through a top surface of the fairing.

12. The rotorcraft of claim 7, wherein for each of the dampers, a first end of the damper is connected to a trailing edge side of a respective one of the blade extension arms and a second end of the damper is connected to an attachment point of the rotor hub.

13. A method comprising:
drawing air into a fairing disposed over a rotor hub through an inlet plenum using centrifugal force;
directing the air toward a plurality of dampers associated with the rotor hub via a plurality of ducts, wherein each one of the ducts is associated with and directs a portion of the air toward one of the dampers; and
expelling the air from the fairing via a plurality of clearance windows, wherein each one of the clearance windows corresponds to and is proximate one of the dampers;
wherein the portion of the air directed toward each one of the dampers is expelled through the corresponding one of the clearance windows.

14. The method of claim 13, wherein each of the dampers comprises a lead-lag damper.

15. The method of claim 13, wherein each of the dampers comprises a fluid-elastic damper.

16. The method of claim 13, wherein the fairing is dome shaped.

17. The method of claim 13, wherein the inlet plenum is connected to an inlet disposed through a top surface of the fairing.

18. The method of claim 13, wherein for each of the dampers, a first end of the damper is connected to a trailing edge side of a respective one of the blade extension arms and a second end of the damper is connected to an attachment point of the rotor hub.

* * * * *